Feb. 23, 1954     J. P. LANDRUM     2,670,058
BRAKE SHOE ADJUSTER
Filed Nov. 1, 1950
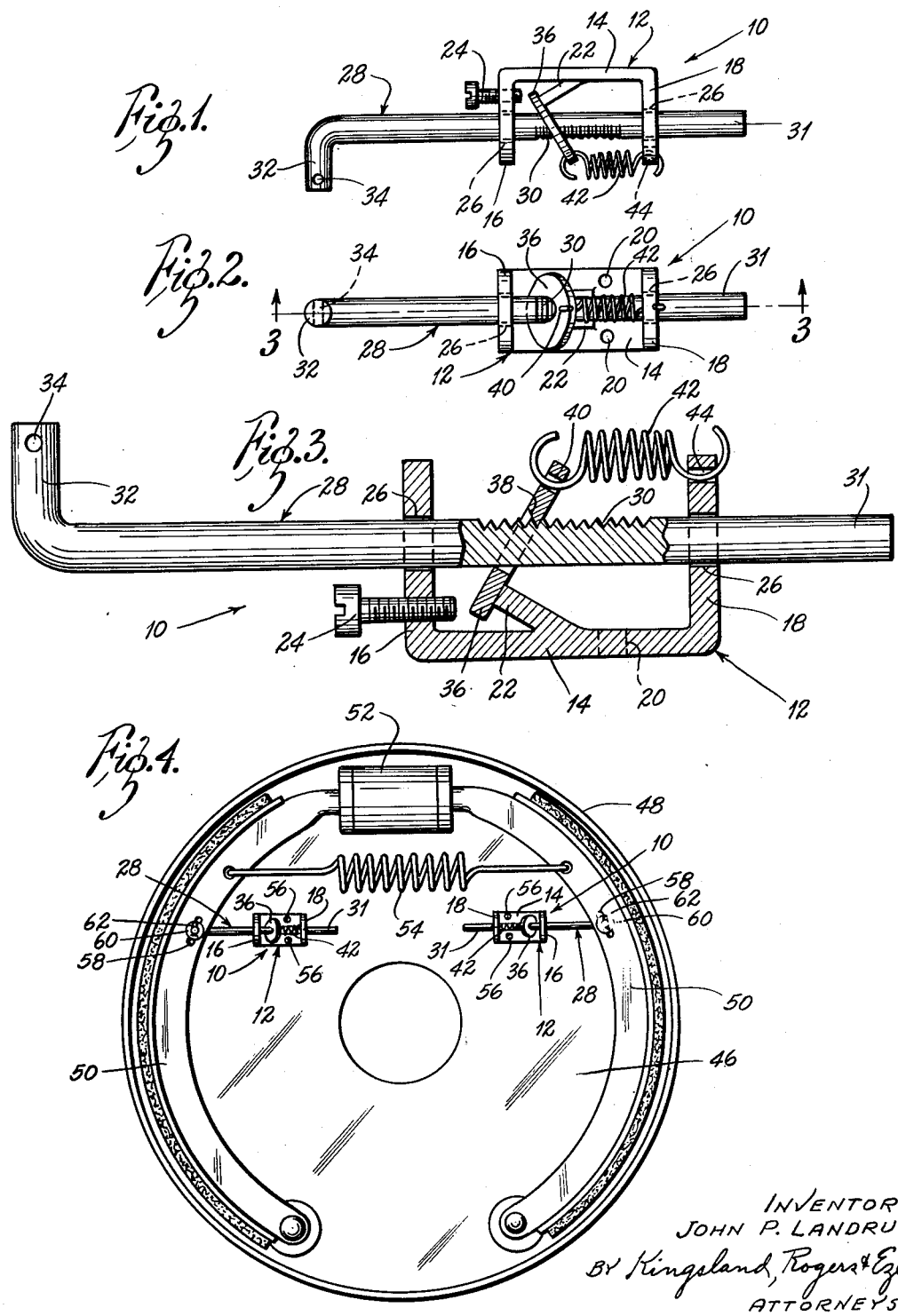
INVENTOR:
JOHN P. LANDRUM,
BY Kingsland, Rogers & Ezell
ATTORNEYS Patented Feb. 23, 1954

2,670,058

UNITED STATES PATENT OFFICE 2,670,058

BRAKE SHOE ADJUSTER

John P. Landrum, Centralia, Ill.

Application November 1, 1950, Serial No. 193,351

9 Claims. (Cl. 188—79.5)

The present invention relates generally to the automotive art, and more particularly to a novel brake shoe adjuster for automatically adjusting the space between the brake drum and the lining of the brake shoe to compensate for the wear of the latter.

In one form, the device comprises a supporting bracket having a pair of spaced side walls which contain aligned openings. Means are provided for fastening the supporting bracket to the back plate of the brake assembly. A rod-like actuating member which has one end thereof connected to a brake shoe is slidably disposed in the aligned openings. The actuating member is smooth except for a series of spaced notches adjacent its center. A washer-like member is disposed on the actuating member, and a pair of spaced stop members are disposed on either side of the washer-like member to limit its movement, one of the stop members being adjustable relative to the other stop member. A coiled spring is connected between the disc-like member and one wall to cause the disc-like member to bind on the actuating member so as to prevent relative movement between the disc-like member and the actuating member when the latter is moved in one direction.

As is well known to those familiar with the operation of automotive equipment, it is necessary to periodically have the brakes adjusted to compensate for the wear of the linings on the brake shoes. Numerous devices have been patented for automatically adjusting the space between the brake drum and the brake shoe to compensate for this wear, but they are not completely satisfactory for many reasons. Most of them are intricate and expensive and have to be custom-made for each particular installation. Others require that the existing shoes or drums be replaced with specially designed ones.

It is an object of the present invention, therefore, to provide a novel brake shoe adjuster which can be easily and quickly installed on existing equipment. More particularly, it is an object to provide such an adjuster which can be fastened to existing equipment by merely drilling a few holes for fastening the device between the back plate and the brake shoe.

Another object is to provide a novel brake shoe adjuster which can be used universally on various types and sizes of trucks and automobiles. More particularly, it is an object to provide such an adjuster which contains means for adjusting the amount of movement of the brake shoe relative to the brake drum to meet the requirements of the different types and sizes of brake assemblies.

Another object is to provide a novel brake shoe adjuster which becomes inoperative after the linings of the brake shoes wear down a predetermined amount so as to prevent the brake shoe rivets from scoring the drum. More particularly, it is an object to provide a smooth actuating rod which contains a series of spaced notches which terminate a predetermined distance from one end thereof so that after the lining has been worn down a predetermined distance, a latching washer which cooperates with the rod will slide freely in both directions on the smooth portion of the rod and, thereby, prevent any further automatic adjustment of the device.

Other objects are to provide a novel brake shoe adjuster which is simple in construction and relatively inexpensive to manufacture, and which will function for long periods of time without maintenance or repair.

Further objects and advantages of the present invention will be apparent from the following description, reference being had to the accompanying drawing, wherein a preferred embodiment of the present invention is shown, in which:

Fig. 1 is a top plan view of a brake shoe adjuster constructed in accordance with the teachings of the present invention;

Fig. 2 is a front elevational view thereof;

Fig. 3 is an enlarged vertical sectional view of the adjuster taken substantially on the line 3—3 in Fig. 2; and Fig. 4 is an elevational view of a brake assembly showing two brake shoe adjusters mounted on the back plate of the drum and operatively connected with the brake shoes.

Referring to the drawing more particularly by reference numerals, 10 indicates generally a brake shoe adjuster embodying the teachings of the present invention. It includes a U-shaped supporting bracket 12 which has a transverse portion 14 and two leg portions 16 and 18. Openings 20 are contained in the transverse portion 14 for mounting the device on a fixed support, and a stop member 22 extends obliquely upwardly from the transverse portion 14 toward the leg portion 16. Extending inwardly from adjacent the base of the leg portion 16 toward the stop member 22 is an adjusting screw 24.

Aligned elongated openings 26 are contained in the leg portions 16 and 18, and slidably disposed therein is a round actuating rod 28. The actuating rod 28 contains a series of spaced notches 30 adjacent its center and a smooth end portion 31. The other end of the rod 28 contains a transversely extending portion 32 which has an opening 34 therein.

Disposed on the rod 28 between the leg portions 16 and 18 is a latching washer 36 which has one portion thereof positioned between the ends of the stop member 22 and the adjusting screw 24. As shown in Fig. 3, a portion of the inner peripheral edge 38 of the washer 36 is wedge-shaped so as to better engage the notches 30.

A small opening 40 is contained in the washer 36 adjacent the outer peripheral edge thereof and receives one end of a coiled spring 42, the other end of which is disposed in an opening 44 in the leg portion 18. Thus, the spring 42, in cooperation with the stop member 22, causes the washer 36 to bind on the actuating rod 28 so as to prevent the latter from moving relative to the washer 36 when the rod is moved in the direction of the leg portion 18.

As shown in Fig. 3, two adjusters 10 are used with each brake assembly which includes a back plate 46, a brake drum 48, a pair of brake shoes 50, a piston assembly 52 for forcing the brake shoes 50 against the drum 48, and a coiled spring 54 connected between the shoes 50 for pulling them away from the drum 48.

The adjusters 10 are mounted on the back plate 46 with screws 56 which extend through the openings 29. Slots 58 are formed in the brake shoes 50 to receive the ends 32 of the actuating rods 28, the ends 32 being maintained in position by washers 60 and cotter pins 62 which extend through the openings 34. Thus, the only modification required of existing equipment is the fastening of the actuators 10 to the back plate 46 and the forming of the slots 58 in the brake shoes 50.

OPERATION

In normal operation, each time the brake pedal (not shown) is depressed, the pistons within the piston assembly 52 are forced outwardly by the brake fluid so as to cause the linings of the brake shoes 50 to be forced against the inner surface of the brake drum 48. When the brake pedal (not shown) is released so as to release the pressure in the piston assembly 52, the spring 54 pulls the brake shoes 50 away from the drum 48. Normally, without any adjusters, when the linings of the brake shoes wear down, the distance the brake shoes must be moved before the linings contact the drum increases, thereby requiring a further depression of the foot pedal. With the instant device, however, the screw 24 is adjusted so that the distance between the end of the screw 24 and the stop member 22 is proportional to the desired operating space between the linings of the shoes 50 and the drum 48 which, in turn, determine the distance the foot pedal must be depressed. Thus, when the foot pedal (not shown) is depressed, the actuating rods 28 are carried outwardly by the brake shoes 50 so as to cause the washers 36 to be moved toward the inner ends of the adjusting screws 24. When the linings are new and the devices are properly adjusted, the washers 36 just touch the ends of the screws 24. When the foot pedal (not shown) is released, the spring 54 retracts the shoes 50 until the washers 36 abut the stop members 22. The binding of the washers 36 on the actuating rod 28 and their contact with the stop member 22 prevent further inward movement of the actuating member 28, thereby making the movement of the brake shoes and the brake pedal proportional to the distance between the end of the adjusting screw 24 and the stop member 22. As the linings of the brake shoes 50 wear down, the actuating rod 28 will move farther outwardly so that the washers 36 will contact the inner ends of the screws 24 and then pivot around them so as to cause the wedge-like portions 38 to lift out of the grooves 30 and permit the rods 28 to move outwardly relative to the washers 36. After the actuating members 28 have moved outwardly a distance to compensate for the wear of the brake shoe linings, the washers 36 will drop back into position due to the action of the springs 42 so that the wedge-like portions 38 thereof engage the next adjacent notch. The spaced notches 30 prevent the washers 36 from jumping back all the way to the stop members 22. When the foot pedal (not shown) is released, the brake shoes 50 will be pulled inwardly by the action of the spring 54 until the washers 36 again abut the stop members 22. Thus, the brake shoes 50 are moved closer to the brake drums 48, but the amount of movement required of the brake pedal will again be the same, or, in other words, proportional to the distance between the ends of the adjusting screws 24 and the stop member 22.

If the linings of the brake shoes 50 continue to wear, the actuating rods 28 will continue to move outwardly relative to the washers 36 until the latter reach the smooth portions 31 of the rods 28. Thereafter, the washers 36 will slide freely on the rods 28 in both directions so that the spring 54 will be able to pull the brake shoes 50 farther away from the drum 48, thereby requiring that the foot pedal (not shown) be depressed closer to the floor to apply the brakes. This warns the operator that the linings of the brake shoes 50 are worn to the point where they should be replaced before the drums are scored by the brake shoe rivets. It has been determined that each adjuster 10 should be initially installed so that the washers 36 reach the last notch when the brake lining is two-thirds worn.

Manifestly, if desirable or necessary, the brackets 12 can be mounted on the brake shoes 50 and the ends 32 of the actuating rods 28 fastened to the back plate 46.

Thus, it is apparent that there has been provided a novel brake shoe adjuster which fulfills all of the objects and advantages sought therefor. The device is very simple in construction, and the adjusting screw permits it to be easily and quickly adjusted for any desired brake pedal movement, and for any type and size of brake assembly. The notches in the actuating rod prevent any false movement of the washer and assures that it will move only one notch at a time. The smooth portion adjacent the notched portion permits free movement of the washer relative to the actuating rod so as to serve notice on the operator that the brake linings should be replaced. And further, the installation of the device requires no change in existing standard equipment except the drilling of holes.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. A device of the type described, comprising a supporting bracket; an elongated actuating member mounted on the bracket for reciprocating movement relative thereto; means within said bracket including a yieldably biased member adapted to engage said actuating member permitting movement of the actuating member relative to the bracket a preselected distance between a first and second position, said means preventing movement of the actuating member in one direction beyond the second position but permitting movement in the other direction beyond the first position, the actuating rod when moved in the other direction beyond the first position being limited in its movement in the one direction a distance equal to the preselected distance, and said means being adjustable for varying the preselected distance.

2. A device of the type described, comprising a supporting bracket; an elongated actuating member mounted on the bracket for reciprocating movement relative thereto; a member having opposed peripheral portions disposed about the actuating member; spaced stop means supported by said supporting bracket limiting movement of the one peripheral portion, both of said stop means being located within said bracket for establishing physical stoppage of said member having opposed peripheral portions when brought in contact therewith; and yieldable means biasing the other peripheral portion in the direction of one of the stop means so as to cause the member to bind on the actuating member and limit movement of the actuating member in that direction; one of said stop means being adjustable relative to the other stop means.

3. A device of the type described, comprising a supporting bracket; an elongated actuating member mounted on the bracket for reciprocating movement relative thereto; a member having opposed peripheral portions disposed about the actuating member; stop means supported by said supporting bracket preventing movement of the one peripheral portion in one direction, both of said stop means being located within said bracket for establishing physical stoppage of said member having opposed peripheral portions when brought in contact therewith; and yieldable means biasing the other peripheral portion in the same direction so as to cause the member to bind on the actuating member; the actuating member containing a series of spaced notches for engagement with at least one peripheral portion of the member binding thereon.

4. A device of the type described, comprising a supporting bracket having spaced side walls; aligned openings in the side walls; a rod-like actuating member disposed in said openings for reciprocating movement; a washer-like member disposed on the actuating member; stationary spaced stops supported by said supporting bracket on each side of the washer-like member, said spacing being sufficient for movement of the washer-like member therebetween; and a coiled spring connected between the washer-like member and one side wall; one of said stop members being adjustable relative to the other stop member.

5. A device of the type described, comprising a supporting bracket having spaced side walls; aligned openings in the side walls; a rod-like actuating member disposed in said openings for reciprocating movement; said actuating member containing a series of spaced notches; a washer-like member disposed on the actuating member; stationary spaced stops supported by said supporting bracket on each side of the washer-like member, said spacing being sufficient for movement of the washer-like member therebetween; and a coiled spring connected between the washer-like member and one side wall.

6. A device of the type described, comprising a supporting bracket having spaced side walls; aligned openings in the side walls; a rod-like actuating member disposed in said openings for reciprocating movement, said actuating member containing a series of spaced notches; a disc-like member having an opening therein disposed on the actuating member, the inner peripheral edge of the disc-like member being wedge-shaped for engagement with the notches; stationary spaced stops supported by said supporting bracket on each side of the disc-like member, said spacing being sufficient for movement of the disc-like member therebetween; and a coiled spring connected between the disc-like member and one side wall.

7. A device of the type described, comprising a supporting bracket having spaced side walls; aligned openings in the side walls; a rod-like actuating member disposed in said openings for reciprocating movement, said actuating member containing a series of spaced notches and a smooth portion adjacent one end of the notches; a plate-like member having an opening therein disposed on the actuating member for engagement with said notches and at least a part of said smooth portion of the actuating rod; stationary spaced stops supported by said supporting bracket on each side of the plate-like member, said spacing being sufficient for movement of the plate-like member therebetween; and a coiled spring between the disc-like member and one side wall.

8. An automatic adjuster for use with a brake assembly including a back plate and a brake shoe, comprising a supporting bracket having spaced side walls; means for fastening the bracket to the back plate; aligned openings in the side walls; a rod-like actuating member slidably disposed in said openings; means for fastening one end of the actuating member to the brake shoe; a disc-like member having an opening therein disposed on the actuating member; stationary spaced stop means supported by said supporting bracket on each side of the disc-like member, said spacing being sufficient for movement of the disc-like member therebetween; and a coiled spring between the disc-like member and one wall.

9. An automatic adjuster for use with a brake assembly including a back plate and a brake shoe, comprising a supporting bracket having spaced side walls; means for fastening the bracket to the back plate; aligned openings in the side walls; a rod-like actuating member slidably disposed in said openings; means for fastening one end of the actuating member to the brake shoe; a disc-like member having an opening therein disposed on the actuating member; stationary spaced stop means supported by said supporting bracket on each side of the disc-like member, said spacing being sufficient for movement of the disc-like member therebetween; and a coiled spring between the disc-like member and one wall; one of said stop members being adjustable relative to the other stop member.

JOHN P. LANDRUM.

References Cited in the file of this patent

UNITED STATES PATENTS

| Number | Name | Date |
| --- | --- | --- |
| 1,227,955 | Sauvage | May 29, 1917 |
| 1,991,262 | Sauvage | Feb. 12, 1935 |
| 2,229,919 | Dimont | Jan. 29, 1941 |
| 2,291,662 | Thibeault | Aug. 4, 1942 |
| 2,327,819 | Robeson | Aug. 24, 1943 |
| 2,386,913 | Sawtelle | Oct. 16, 1945 |
| 2,392,956 | Thibeault | Jan. 15, 1946 |
| 2,526,149 | Myers et al. | Oct. 17, 1950 |